(12) United States Patent
Simburger (10) Patent No.: US 10,074,985 B2
(45) Date of Patent: Sep. 11, 2018

(54) SOLAR AND/OR WIND INVERTER

(71) Applicant: The Aerospace Corporation, El Segundo, CA (US)

(72) Inventor: Edward J Simburger, Agoura Hills, CA (US)

(73) Assignee: The Aerospace Corporation, El Segundo, CA (US)

( * ) Notice: Subject to any disclaimer, the term of this patent is extended or adjusted under 35 U.S.C. 154(b) by 74 days.

(21) Appl. No.: 15/188,117

(22) Filed: Jun. 21, 2016

(65) Prior Publication Data

US 2017/0366008 A1    Dec. 21, 2017

(51) Int. Cl.
| | |
|---|---|
| *H02J 1/12* | (2006.01) |
| *H02J 3/00* | (2006.01) |
| *H02J 5/00* | (2016.01) |
| *H03K 19/00* | (2006.01) |
| *H02J 3/28* | (2006.01) |
| *H02J 3/38* | (2006.01) |

(52) U.S. Cl.
CPC ............... *H02J 3/28* (2013.01); *H02J 3/382* (2013.01); *Y02E 10/563* (2013.01); *Y10T 307/406* (2015.04); *Y10T 307/516* (2015.04)

(58) Field of Classification Search
CPC .... H02J 3/383; H02J 3/382; H02J 3/28; H02J 3/32; H02J 7/35; H02J 7/345; Y02E 10/563; Y10T 307/406; Y10T 307/516
See application file for complete search history.

(56) References Cited

U.S. PATENT DOCUMENTS

| 5,493,204 | A  | 2/1996 | Caldwell |
| 7,804,184 | B2 | 9/2010 | Yuan et al. |
| 7,919,953 | B2 | 4/2011 | Porter et al. |
| 8,093,756 | B2 | 1/2012 | Porter et al. |
| 8,860,236 | B2 | 10/2014 | Nasiri |
| 2005/0254191 | A1* | 11/2005 | Bashaw ................ H02J 3/383 361/62 |
| 2006/0250902 | A1 | 11/2006 | Bender et al. |
| 2009/0295227 | A1* | 12/2009 | Chang .................. H02J 3/32 307/46 |
| 2010/0008119 | A1* | 1/2010 | O'Brien ........... H01L 31/02021 363/132 |
| 2010/0057268 | A1 | 3/2010 | Smith et al. |
| 2010/0142237 | A1 | 6/2010 | Yuan et al. |
| 2010/0246230 | A1 | 9/2010 | Porter et al. |

(Continued)

FOREIGN PATENT DOCUMENTS

CN    201976037 U    9/2011

OTHER PUBLICATIONS

Faycal Bensamaine et al., "Modeling and Control of a STATCOM-Supercapacitors Energy Storage System Associated with a Wind Generator", published in Industrial Electronics (ISIE), Jun. 1-4, 2014.

(Continued)

*Primary Examiner* — Rexford Barnie
*Assistant Examiner* — Rasem Mourad
(74) *Attorney, Agent, or Firm* — LeonardPatel PC (57) ABSTRACT

A solar and/or wind inverter that uses an ultracapacitor for grid stabilization. The ultracapacitor may be directly tied to, and placed between, a power source and an inverter. The ultracapacitor may supply power to a grid via the inverter during a reduction of power or a loss in power from the grid.

24 Claims, 6 Drawing Sheets

(56) References Cited

U.S. PATENT DOCUMENTS

| | | | | |
|---|---|---|---|---|
| 2011/0031748 A1* | 2/2011 | Arinaga | ............... | F03D 7/0276 290/44 |
| 2011/0031925 A1* | 2/2011 | Simburger | ............. | B64G 1/428 320/101 |
| 2011/0089693 A1* | 4/2011 | Nasiri | ................... | F03D 7/0272 290/44 |
| 2011/0181251 A1 | 7/2011 | Porter et al. | | |
| 2011/0210608 A1* | 9/2011 | O'Brien | ................. | H02J 3/383 307/31 |
| 2011/0245987 A1* | 10/2011 | Pratt | .................... | H01M 10/44 700/295 |
| 2012/0013190 A1* | 1/2012 | Chang | .................... | H02J 3/382 307/80 |
| 2012/0025614 A1 | 2/2012 | Taimela et al. | | |
| 2014/0077607 A1 | 3/2014 | Clarke et al. | | |
| 2015/0092462 A1* | 4/2015 | Ohori | ..................... | H02M 7/44 363/71 |

OTHER PUBLICATIONS

Kara Clark et al., "The Western Grid Can Weather Disturbances Under High Renewable Penetrations" published by Power Engineering, accessible at http://www.power-eng.com/articles/print/volume-119/issue-1/features/the-western-grid-can-weather-disturbances-under-high-renewable-penetrations.html, and published on Jan. 21, 2015.

Kathie Zipp, "Ultracapacitors Help with Solar Grid Challenges" issued on Aug. 12, 2013 from http://www.solarpowerworldonline.com/2013/08/ultracapacitors-help-with-solar-grid-challenges/.

Kleber Facchini, "How to Manage Impact as Solar Deployment Increases" by Zackin Publications, Inc., in Apr. 2012.

Wikipedia, "Solar Inverter" found on Jan. 25, 2016 at https://en.wikipedia.org/wiki/Solar_invertor.

Wikipedia, "Supercapacitor" found on Jan. 25, 2016 at https://en.wikipedia.org/wiki/Supercapacitor.

* cited by examiner

SOLAR AND/OR WIND INVERTER

FIELD

The present invention generally relates to maintaining grid stability, and more particularly, to a solar and/or wind inverter that uses an ultracapacitor for grid stabilization.

BACKGROUND

Traditionally, with the utility grid (hereinafter "grid"), all of the generation sources are large rotating machines, and the grid controls the balance between the load and generation by controlling the frequency of the grid. The rotating machines store a portion of the energy in the rotating masses thereof. This stored energy either absorbs excess energy from the grid by small increases in the speed of rotation or supplies energy to the grid by small decreases in the speed of rotation in conjunction with a generator. This results in small changes in the grid's frequency. Thus, the electrical energy produced by the grid's generators matches that of the electrical energy required by the system load.

As the world population size increases, generation of energy for the grid is moving to more and more renewables sources, such as solar and wind generators.

Figure 1:
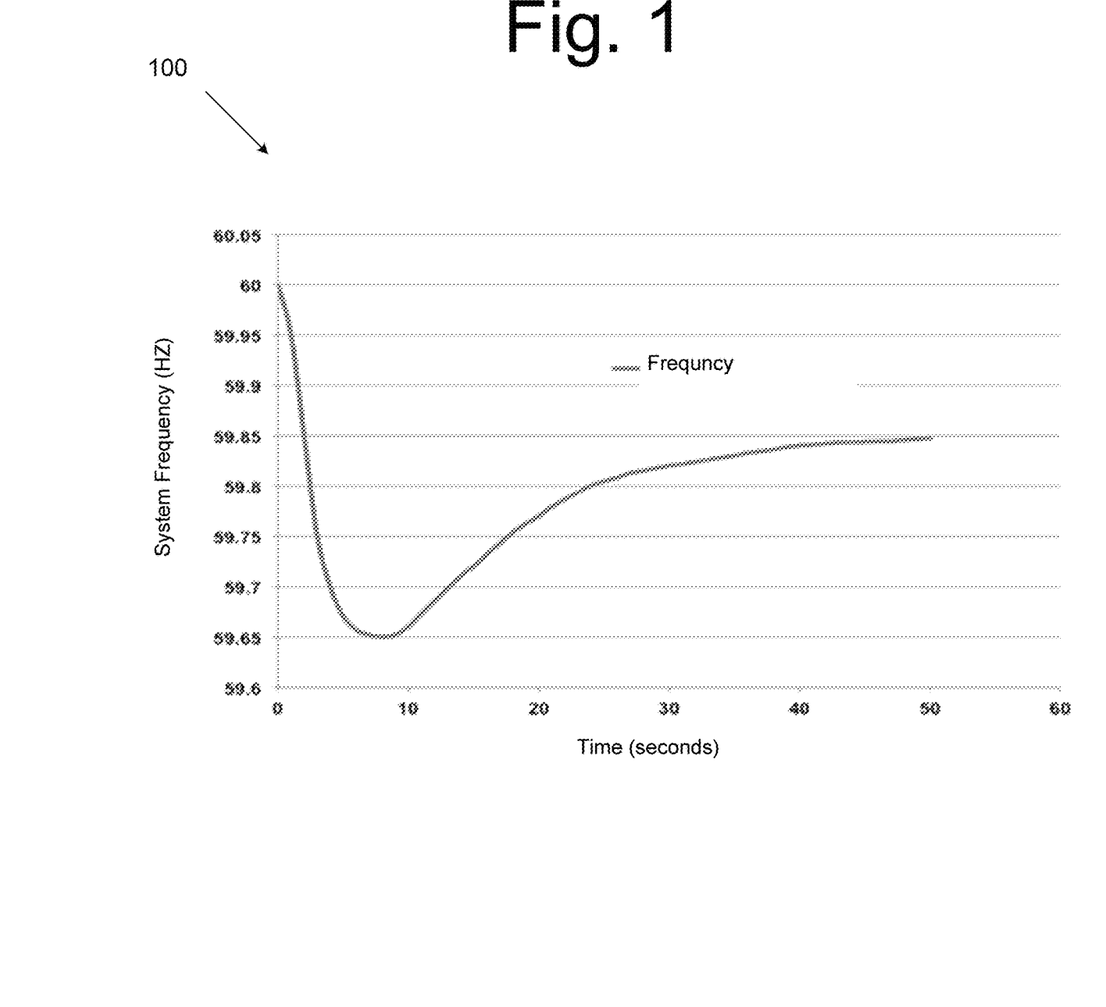
FIG. 1 is a graph illustrating a typical frequency response with a temporary loss of power on the grid.

There have been discussions for the ability of the Western Interconnection to withstand a disturbance caused by the loss of a large generation source with a large amount of wind or solar photovoltaic technology on the Western Interconnection. In some simulations, frequency disturbance on the grid would come close to the load shed initiation frequency of 59.5 Hz. See, for example, FIG. 1, which shows the frequency response of the Western Interconnection with 44% penetration of solar and wind generation. This may occur when there is a temporary loss of power on the grid, e.g., at a large coal fired or nuclear power plant.

With the minimum frequency of 59.65 HZ, the system would be marginally stable. There has been further discussion that wind and solar could contribute to the system response to this type of disturbance by operating below maximum power conditions, which would allow the wind and solar power plants to increase their output in response to a frequency disturbance. If this were implemented, the time required to restore system frequency to 60 Hz would be reduced.

However, since wind and solar power generators are inertia-less generation sources, wind and solar power generators do not contribute to supplying energy to the grid by slowing down the rotating mass of a hydro or thermal turbine generator. For this reason, it has been suggested that grid support between the time of disturbance initiation and governor response by the remaining generators was to run displaced coal fired generation as synchronous condensers to make up for the lack of the ability of solar and wind generators to respond to the frequency disturbance in a similar manner to that of conventional hydro and thermal generation.

To prevent or mitigate these issues, an alternative approach may be beneficial.

SUMMARY

Certain embodiments of the present invention may provide solutions to the problems and needs in the art that have not yet been fully identified, appreciated, or solved by current grid stabilization systems. For example, some embodiments of the present invention pertain to a novel solar and/or wind inverter that uses an ultracapacitor for grid stabilization.

In an embodiment, an apparatus includes an ultracapacitor connected in parallel with, and in between, a power source and an inverter. The ultracapacitor supplies power to the inverter during a reduction of power or a loss in power from the grid resulting in a frequency disturbance.

In another embodiment, an apparatus includes an ultracapacitor that may provide power to a grid via an inverter during a reduction in power or a loss in power from the grid. The apparatus also includes a peak power tracker that may increase an output current of the inverter during the reduction in power or the loss in power from the grid. The ultracapacitor may be directly tied to, and placed in between, a power source and the inverter.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments disclosed herein generally pertain to a novel approach for stabilizing a grid during a reduction or loss of power. In some embodiments, an ultracapacitor is connected to an output of a direct current (DC) output of a solar array (SA) or wind generator. For purposes of explanation, an SA or wind generator will be referred to as "generator" or "power source".

The ultracapacitor, or supercapacitor in some embodiments, may provide storage of energy that may be used during a frequency disturbance. Frequency disturbance may occur for several reasons. For example, frequency disturbance may be caused by a loss of a large coal or nuclear power plant. In another example, a change in the output of the power source may occur when clouds pass over the SA, for example. In yet another example, a frequency disturbance may occur when the wind speed is variable over short periods of time.

Figure 2:
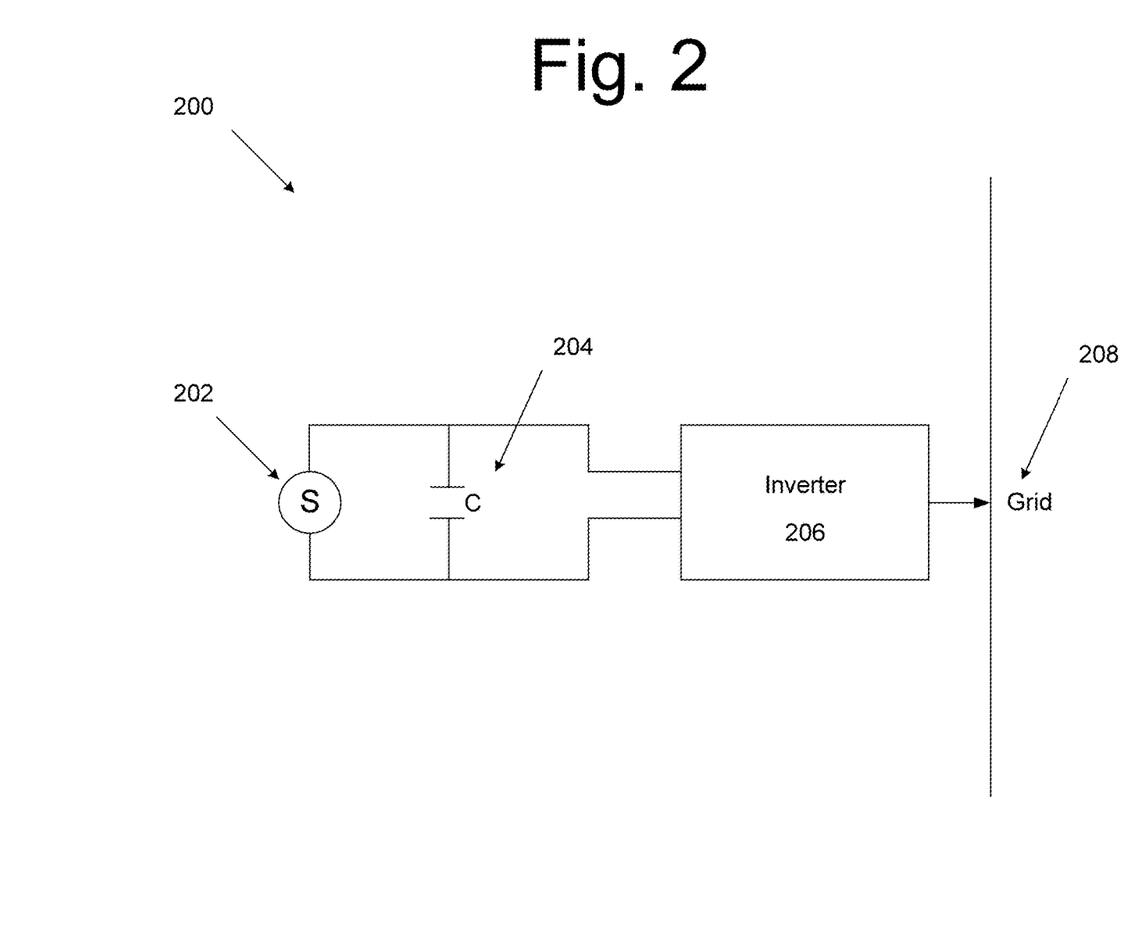
FIG. 2 is a circuit diagram illustrating a system that provides frequency support for a grid, according to an embodiment of the present invention.

FIG. 2 is a circuit diagram illustrating a system 200 that provides frequency support for a grid 208, according to an embodiment of the present invention. System 200 includes a power source 202, an ultracapacitor 204, and an inverter 206 connected in parallel and tied to a grid 208. During normal operation, power flows from power source 202 through ultracapacitor 204 and inverter 206, and then to grid 208.

Ultracapacitor 204 is located between power source 202 and inverter 206. By placing ultracapacitor 204 between power source 202 and inverter 206, ultracapacitor 204 may supply power or energy to the grid via inverter 206 when power supplied by power source 202 is temporarily reduced. This placement also allows ultracapacitor 204 to be quickly recharged during normal operations of power source 202.

Figure 3:
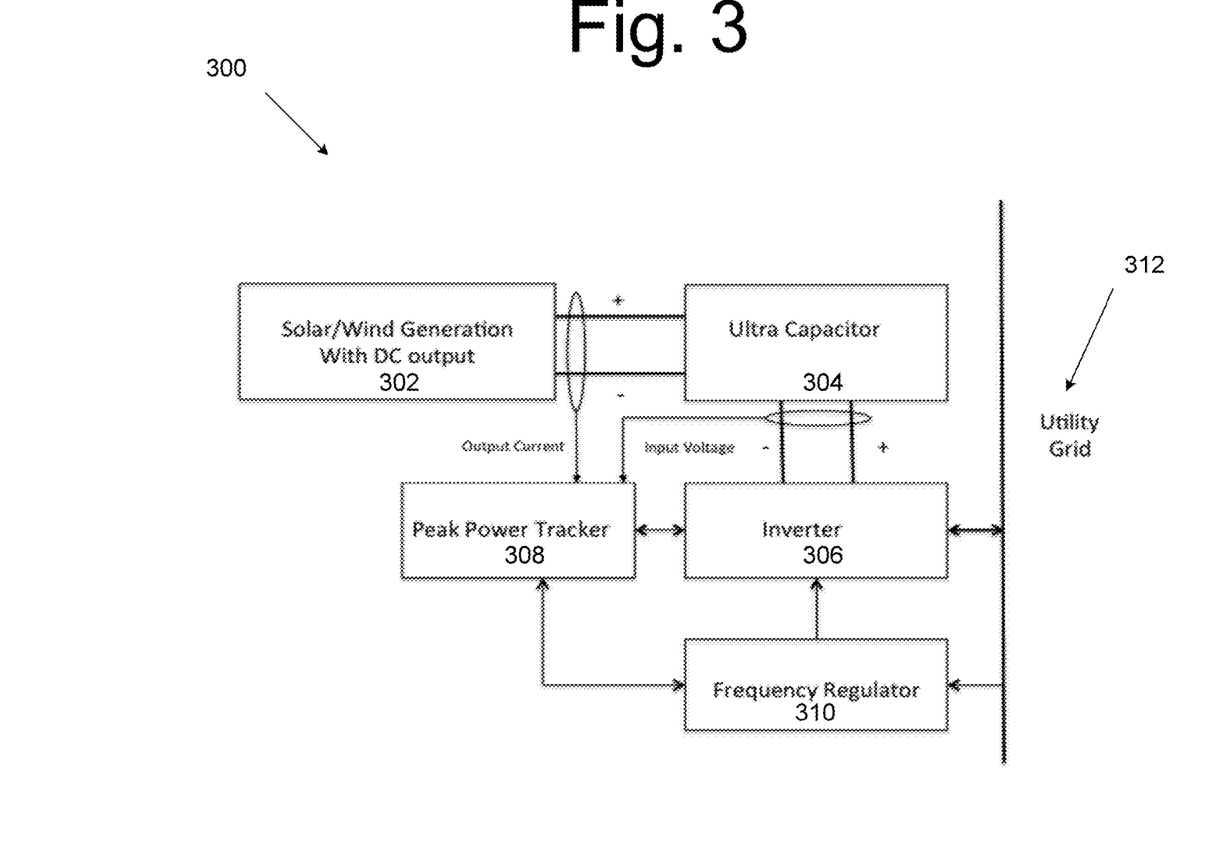
FIG. 3 is a block diagram illustrating a system that provides frequency support for a grid, according to an embodiment of the present invention.

FIG. 3 is a block diagram illustrating a system 300 that provides frequency support for a grid, according to an embodiment of the present invention. Similar to the embodiment shown in FIG. 2, ultracapacitor 304 is placed between a power source 302 and an inverter 306, which is connected to a grid 312. For example, ultracapacitor 304 is connected between the output of power source 302 and the input to inverter 306.

Also connected to grid 312 is a frequency regulator 310. Frequency regulator 310 in some embodiments may monitor a grid frequency, and may command inverter 306 to increase output power of inverter 306 when the grid frequency decreases at a rate that is indicative of a system frequency disturbance. For instance, frequency disturbance may occur when, for example, there is the loss of a major power plant on the grid.

For purposes of explanation, assume, for example, that the system frequency decreased by 0.25 Hz. In this example, frequency regulator 310 may increase the output power of inverter 306 by a certain percentage, e.g., 10 percent, and then slowly reduce the output power of inverter 306 to that equal to the peak power output of power source 302. The rate of returning the output power of inverter 306 would then equal that of the frequency return to the nominal value of 60 Hz.

In certain embodiments, frequency regulator 310 may decrease output power of inverter 306 when the grid frequency increases due to, for example, a loss of load incident. The energy imbalance between the output power of power source 302 may be supplied or absorbed by ultracapacitor 304, which may be connected in parallel between power source 302 and inverter 306.

For purposes of explanation, assume, for example, that a frequency disturbance caused an increase in frequency. In this example, frequency regulator 310 may decrease output power of inverter 306 by a certain percentage, e.g., 10 percent. To accomplish this, frequency regulator 310 may increase the input voltage from ultracapacitor 304, allowing the excess energy from power source 302 to be stored in ultracapacitor 304 during the frequency disturbance. As the frequency on the grid stabilizes, frequency regulator 310 may increase the output power of inverter 306 at a rate equal to the rate that the frequency returns to 60 Hz. The energy stored within ultracapacitor 304 may ultimately be delivered to grid 312 at a time that it can be used.

Frequency regulator 310 may include a grid frequency sensor (not shown). Grid frequency sensor may be the primary sensor in some embodiments for grid disturbance response. For example, during a grid disturbance, system 300 may respond to specified changes in grid frequency in a manner to return the grid frequency to normal operation. Frequency regulator 310, for example, may send commands to inverter 306 and peak power tracker 308 to implement the required change in the operation of system 300.

For resource variability, peak power tracker 308 may control inverter 306. In some embodiments, peak power tracker 308 may sense (or detect) changes in the output current of power source 302 and then begin to ramp the output current of the power source 302 to an operating point where the output power of power source 302 matches the output power being supplied from inverter 306 to grid 312. For example, the ramp rate could be a certain percentage, e.g., 10 percent output change per minute. In this example, frequency regulator 310 may not be utilized. However, if there is a grid disturbance while the resource is changing, frequency regulator 310 may be utilized and take control of system 300.

In some embodiments, peak power tracker 308 may control the output power of inverter 306 to grid 312 under normal operations. For example, peak power tracker 308 may measure the output current from power source 302 and the input voltage at the output terminals of ultracapacitor 304. Peak power tracker 302 may use these values to determine the peak power operating point. The peak power point in some embodiments is the total of output current from power source 302 times or multiply by the voltage at output terminals of ultracapacitor 304.

Under normal operations, the response of peak power tracker 308 to changes in the output current of power source 302 may be dampened due to the fact that ultracapacitor 304 may supply or absorb energy depending upon whether power source 302 is increasing or decreasing output current. Using sunlight as an example, when there is a change in sunlight, the output current of the SA to ultracapacitor 304 may decrease. In this example, peak power tracker 308 may decrease the output current of the SA and input voltage to inverter 306. The decreased amount of power delivered to grid 312 would be equal to the rate that is acceptable for the local grid, e.g., 10 percent per minute maximum.

Peak power tracker 308 may recalculate the new peak power point based upon the output current of power source 302, or in this example, the output current of the SA. The system may stabilize with a peak power voltage nearly the same as before the change in solar insolation with the output current to inverter 306 equal to the output current available from power source 302. The peak power tracker 308 may sense (or detect) the output current of the SA and the input voltage of ultracapacitor 304, which are the same in certain embodiments. Peak power tracker 308 may also monitor the output voltage of ultracapacitor 304 to ensure that maximum energy is delivered to grid 312 under normal operations.

Simply put, peak power tracker 308 may track output voltage of ultracapacitor 304 and output current of power source 302 (e.g., solar/wind generator) to determine a new peak power point when there is a drop in voltage. While this occurs, ultracapacitor 304 may allow inverter 306 to continue to output the same amount of power to grid 312.

Figure 4:
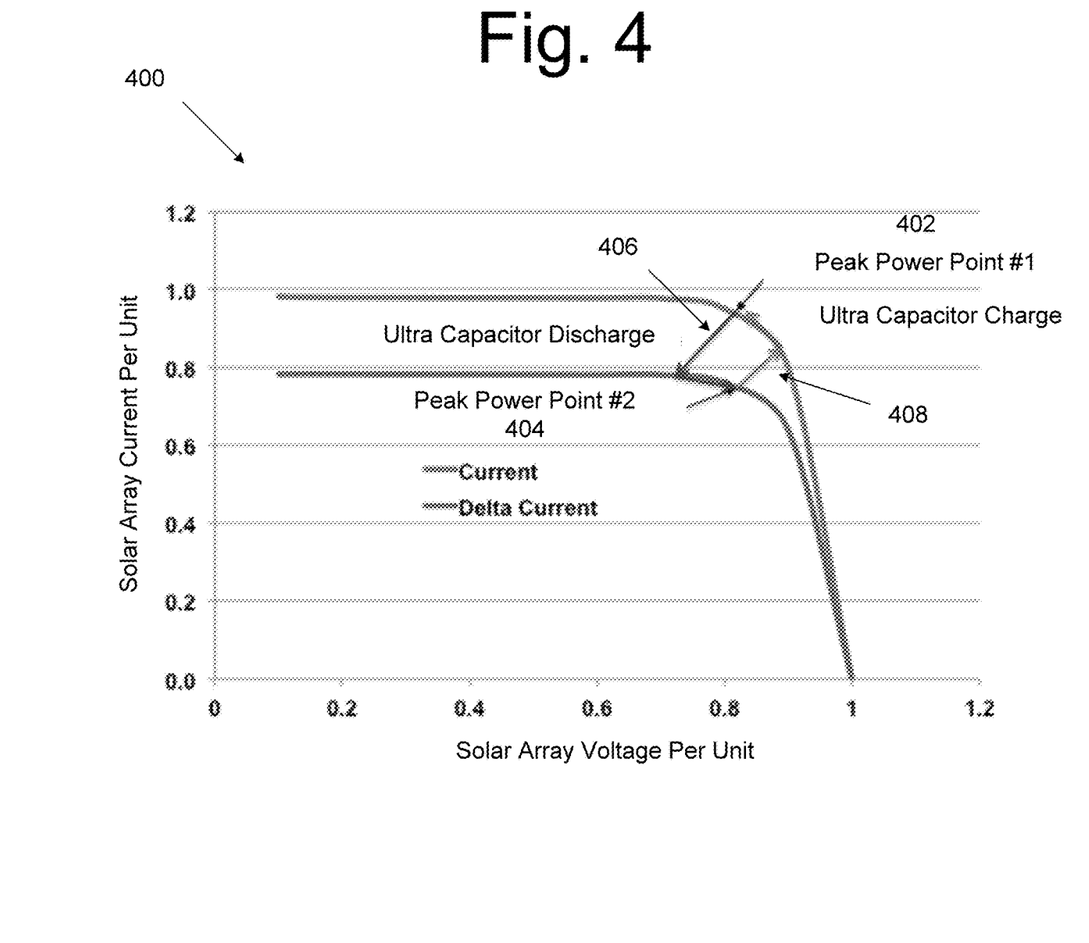
FIG. 4 is a graph illustrating discharge and charge of an ultracapacitor during a loss of solar, wind or grid power, according to an embodiment of the present invention.

FIG. 4 is a graph 400 illustrating discharge and charge of an ultracapacitor during a loss of power from the solar or wind resource, according to an embodiment of the present invention. In graph 400, line 402 shows a first peak power point prior to a reduction in power by a SA, for example. Line 404 shows a second peak power point during the reduction in power by the SA. During this time period, curve 406 shows that the power level of ultracapacitor is being discharged while providing power to the inverter. As power resumes to normal levels for the SA, point 408 shows that the ultracapacitor begins to charge.

In other words, graph 400 shows that when there is a reduction in the output current over time from the power source, the ultracapacitor may output the same amount of power, essentially substituting for the power source during the loss of power from the solar or wind resource. As the ultracapacitor discharges, there is a reduction in voltage on the ultracapacitor. The peak power tracker will notice this reduction in voltage, and reduce the current output of the inverter. When an increase in the output current of power source is detected by the peak power tracker, the voltage will be increased, thereby charging the ultracapacitor and returning the inverter back to the original peak power point.

Figure 5:
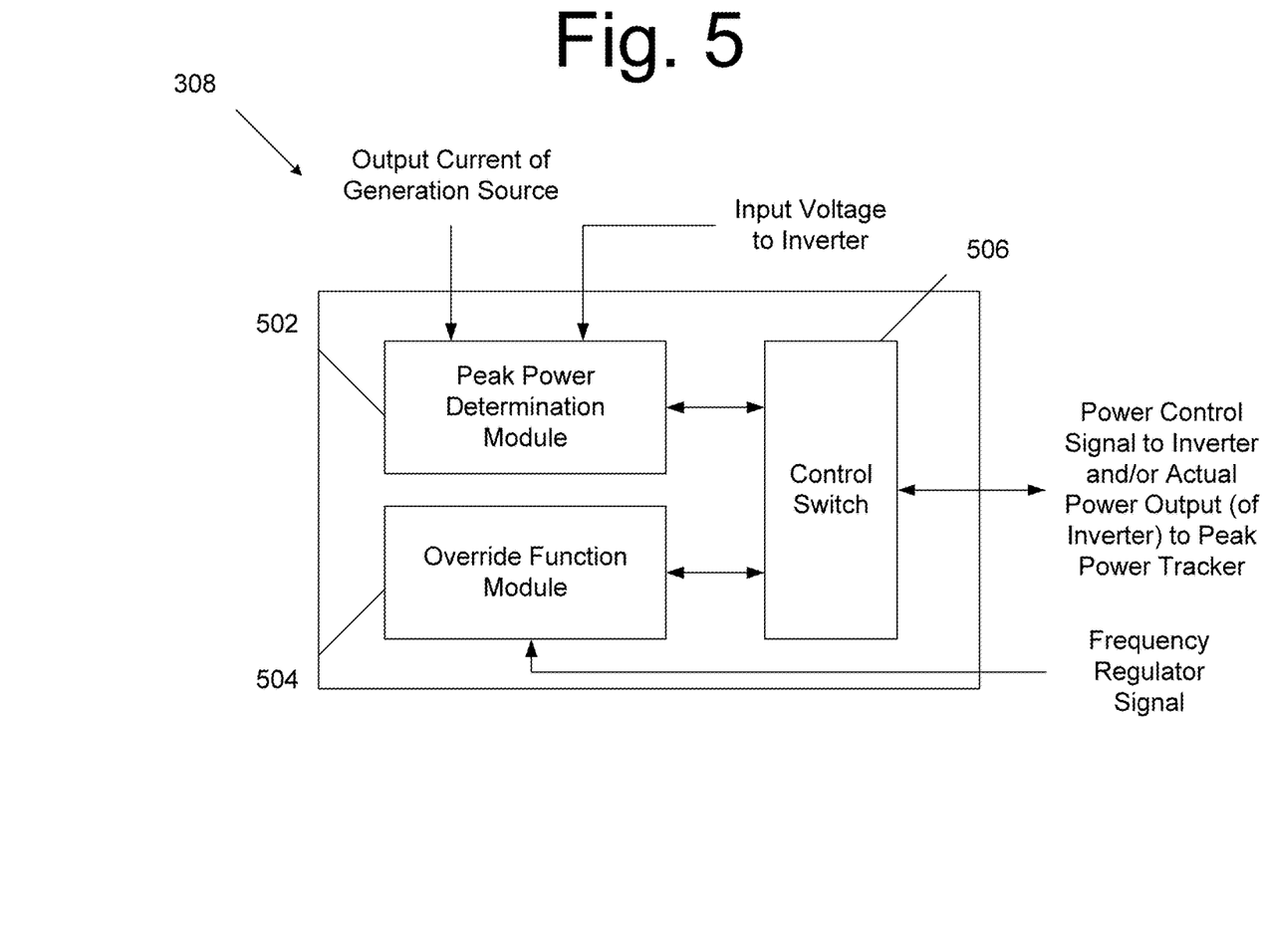
FIG. 5 is a block diagram illustrating a peak power tracker, according to an embodiment of the present invention.

FIG. 5 is a block diagram illustrating peak power tracker 308 shown in FIG. 3, according to an embodiment of the present invention. In some embodiments, peak power tracker 308 includes, but is not limited to, peak power determination module 502, override function module 504, and a control switch 506. Peak power determination module 502 and override function module 504 may be programmed within peak power tracker 308 causing peak power tracker 308 to perform one or more functions.

During operation, peak power tracker 308 receives at least two inputs, e.g., output current of generation source and an input voltage to the inverter. Peak power determination module 502 may measure the output current of the generation source and the input voltage to the inverter, and determine if the power output of the inverter to the grid requires adjustment. This may allow the maximum amount of power that is available from the generation source to be delivered to the grid. If, for example, an adjustment of the power output of the inverter is necessary, peak power determination module 502 may determine that the rate of change of the power output to the grid should not be exceeded by a predefined percentage of the capacity of the inverter per minute. For purposes of explanation, the rate of change may not exceed 10 percent in some cases, because of limitations in the grid's ability to compensate for changes in generation output to the grid. Generally, changes in power delivered to the grid are small, and 10 percent of nameplate rating of the generator can be compensated for by balancing generation to the system load. Stated differently, peak power determination module 502 may determine peak power of the generation source and steer inverter power output to match at a predefined rate per minute.

In some embodiments, peak power tracker 308 may receive a frequency regulator signal. When the frequency regulator signal is received, the frequency regulator signal may indicate that a frequency disturbance on the grid is occurring or has occurred. In some embodiments, override function module 504 may determine the amount of increase or decrease required in the power output, and determine the duration and a rate of change in power output required to stabilize the frequency of the grid. For example, override function module 504 may increase or decrease power control signal to the inverter based on the received frequency regulator signal. Control switch 506 in this example may switch control of the inverter from peak power tracker 308 to the override function. This may help stabilize the frequency of the grid.

Figure 6:
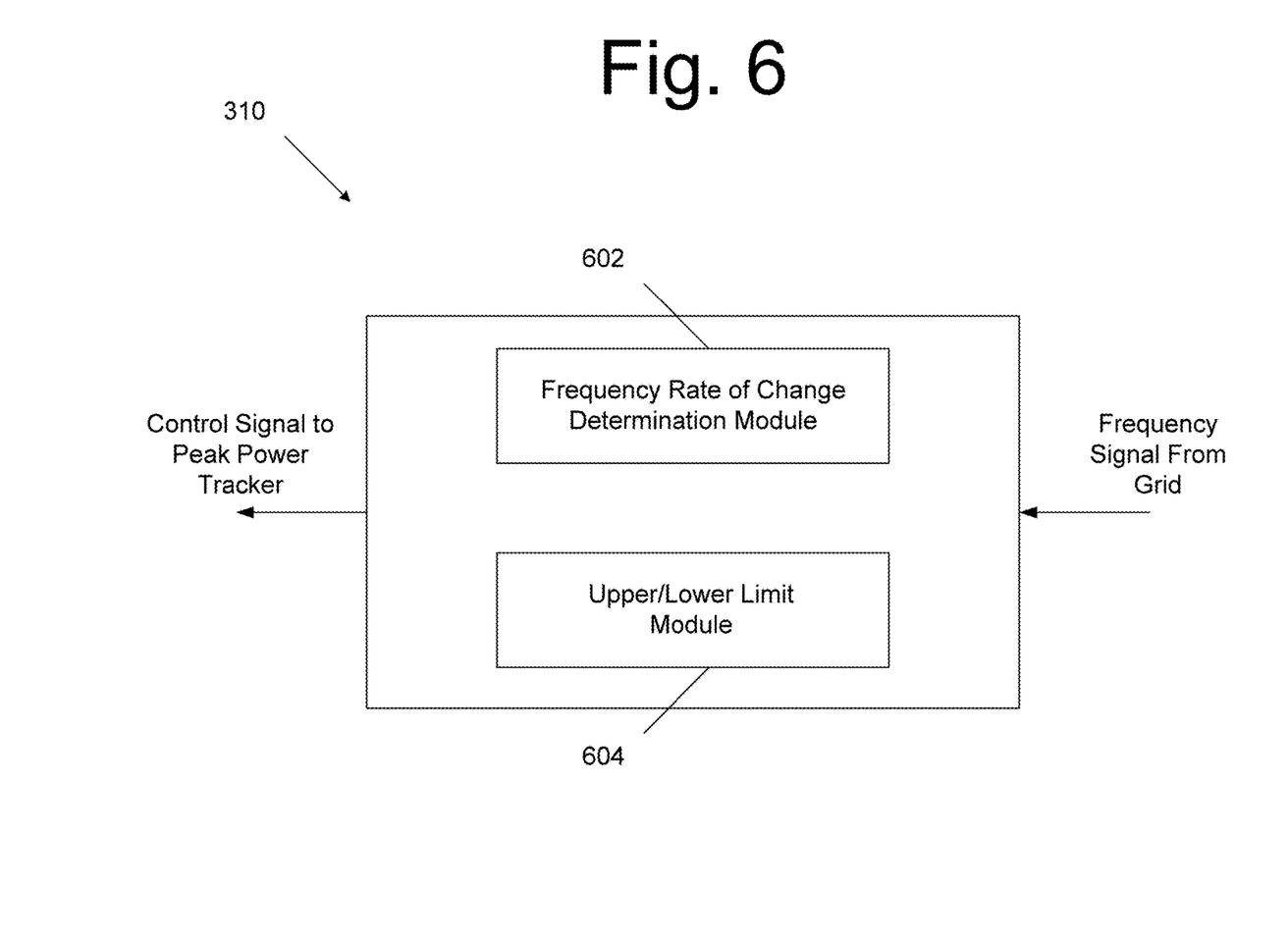
FIG. 6 is a block diagram illustrating a frequency regulator, according to an embodiment of the present invention.

FIG. 6 is a block diagram illustrating frequency regulator 310 shown in FIG. 3, according to an embodiment of the present invention. Frequency regulator 310 may include, but is not limited to, frequency rate of change determination module 602 and upper/lower limit module 604, which may be programmed in frequency regulator 310 to cause frequency regulator 310 to perform one or more functions.

Frequency rate of change determination module 602 in some embodiments may determine rate of change of the grid frequency. This may help determine if grid frequency exceeds a predetermined rate indicating that there is a grid frequency disturbance in progress. Upon detection of the grid frequency disturbance, frequency regulator 310 may send a command to the peak power tracker to increase or decrease the output of the inverter to the grid.

In some embodiments, upper/lower limit module 604 may determine if the grid frequency has exceeded an upper or lower limit. For example, if the rate of change in the grid frequency does not exceed the predetermined threshold, but grid frequency has changed by a predetermined amount, which indicates that a grid frequency disturbance is in progress, then frequency regulator 310 may send appropriate commands to the peak power tracker.

Some embodiments of the present invention generally pertain to a novel solution for maintaining grid stability during loss of generation or load incidents with large penetration of solar and wind generation sources. Current solar and wind generation sources do not contribute to maintaining system frequency during disturbances caused by the loss of a major generation plant or loss of load, such as the Northwest-Southwest DC intertie on the Western grid or a large coal or nuclear power plant. The reason for this is that an electronic inverter, which converts the DC power output of the generator to alternating current (AC) power, does not have any rotating mass or other energy storage device. Conventional generators have large rotating masses, which instantaneously supply or absorb energy during a frequency disturbance by slowing down or speeding up.

Embodiments discussed herein may provide a relatively small amount of storage using, for example, an ultracapacitor between the output terminals of the generator and the inverter. The inverter may convert the DC power to AC power in some embodiments. The inverter may be equipped with a regulator that would monitor grid frequency. Using the grid frequency, the regulator may detect frequency deviations, which are indicative of a major loss of generation or a loss of load event. If a loss of generation or a load event is detected, the inverter may increase or decrease output during the event until the grid frequency stabilizes. The energy to support these functions may be supplied/absorbed by the ultracapacitor connected to the output of the generator.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   an ultracapacitor directly tied to, and placed between, a power source and an inverter, wherein the ultracapacitor supplies power to a grid via the inverter during a frequency disturbance to the grid;
   a peak power tracker under normal conditions is configured to increase or decrease output current of the power source and an input voltage to the inverter depending on the output current of tire power source, and calculate a new peak power point based on the output current, of the power source; and
   a frequency regulator directly tied to the inverter, the grid, and the peak power tracker is configured to, upon grid frequency disturbance, send a command to the peak power tracker to increase or decrease the output power of the inverter to the grid, wherein
   the peak power tracker, in response to the grid frequency disturbance, is configured to increase or decrease power control signal to the inverter based on the received command from the frequency regulator, stabilizing the frequency on the grid.

2. The apparatus of claim 1, wherein the ultracapacitor is connected to an output of the power source and to an input of the inverter.

3. The apparatus of claim 1, wherein the power flows from the power source through the ultracapacitor and inverter to the grid.

4. The apparatus of claim 3, wherein the ultracapacitor is configured to temporarily store power flowing from the power source for later use during the frequency disturbance.

5. The apparatus of claim 1, wherein
   the frequency regulator is further configured to monitor a grid frequency.

6. The apparatus of claim 5, wherein the frequency regulator further comprises
   a frequency rate of change determination module configured to monitors a rate of change of the grid frequency, and detects when the grid frequency exceeds a predetermine rate indicating grid frequency disturbance.

7. The apparatus of claim 6, wherein the frequency regulator further comprises
   an upper and lower limit module configured to detect when the grid frequency exceeds an upper limit or a lower limit, indicative of grid frequency disturbance.

8. The apparatus of claim 1, wherein the output power of the inverter is reduced at a rate equaling to a rate that the grid frequency returns to normalization.

9. The apparatus of claim 1, wherein, when the grid frequency increases, the peak power tracker is further configured to decrease an output power of the inverter.

10. The apparatus of claim 9, wherein, when the grid frequency increases, the peak power tracker is further configured to increase an input voltage from the ultracapacitor, allowing excess power from the power source to be stored in the ultracapacitor.

11. The apparatus of claim 9, wherein, when the grid frequency stabilizes, the peak power tracker is further configured to increase the output power of the inverter at a rate equaling to a rate that the grid frequency returns to normalization.

12. The apparatus of claim 1, further comprising:
    the peak power tracker configured to measure an output current from the power source and an input voltage from the ultracapacitor to determine a peak power point.

13. The apparatus of claim 12, wherein the peak power point is the output current from the power source multiplied by the input voltage from the ultracapacitor.

14. The apparatus of claim 12, wherein, when a change in the output current of the power source is detected, the peak power tracker is further configured to change the output current of the power source to an operating level where the output power of the power source matches the power being supplied to the grid.

15. The apparatus of claim 12, wherein, when the output current of the power source to the ultracapacitor decreases, the peak power tracker is further configured to decrease the input voltage to the inverter, decreasing the power delivered to the grid.

16. The apparatus of claim 15, wherein, when the output current of the power source to the ultracapacitor decreases, the peak power tracker is further configured to recalculate a new peak power point based on the decreased output current of the power source.

17. An apparatus, comprising: an ultracapacitor configured to provide power to a grid via an inverter during a reduction in power or a loss in power from the grid;
    a peak power tracker under normal conditions is configured to increase or decrease output current of a power source and an input voltage to the inverter depending on the output current of the power source, and calculate a new peak power point based on the output, current of lire power source; and
    a frequency regulator directly tied to the inverter, the grid, and the peak power tracker is configured to, upon grid frequency disturbance, send a command to the peak power tracker to increase or decrease the output power of the inverter to the grid, wherein the peak power tracker, in response to the grid frequency disturbance, is configured to increase or decrease power control signal to the inverter based on the received command from the frequency regulator, stabilizing the frequency on the grid.

18. The apparatus of claim 17, wherein
the frequency regulator is further configured to monitor grid frequency.

19. The apparatus of claim 18, wherein, when the grid frequency decreases at a rate indicating a frequency disturbance to the grid, the peak power tracker, upon receipt of the command from the frequency regulator, is further configured to command the inverter to increase an output power of the inverter.

20. The apparatus of claim 19, wherein, when the grid frequency decreases at the rate indicating the frequency disturbance to the grid, the peak power tracker, upon receipt of the command from the frequency regulator, is further configured to initially increase the output power of the inverter by a certain percentage, and gradually reduce the output power of the inverter to equal peak power output of the power source.

21. The apparatus of claim 20, wherein the output power of the inverter is reduced at a rate equaling to a rate that the grid frequency returns to normalization.

22. The apparatus of claim 17, wherein, when the grid frequency increases, the peak power tracker is further configured to decrease an output power of the inverter.

23. The apparatus of claim 22, wherein, when the grid frequency increases, the peak power tracker is further configured to increase an input voltage from the ultracapacitor, allowing excess power from the power source to be stored in the ultracapacitor.

24. The apparatus of claim 22, wherein, when the grid frequency stabilizes, the peak power tracker is further configured to increase the output power of the inverter at a rate equaling to a rate that the grid frequency returns to normalization.

* * * * *